No. 701,675. Patented June 3, 1902.
H. F. BROWN.
WATER METER.
(Application filed Aug. 5, 1901.)
(No Model.)
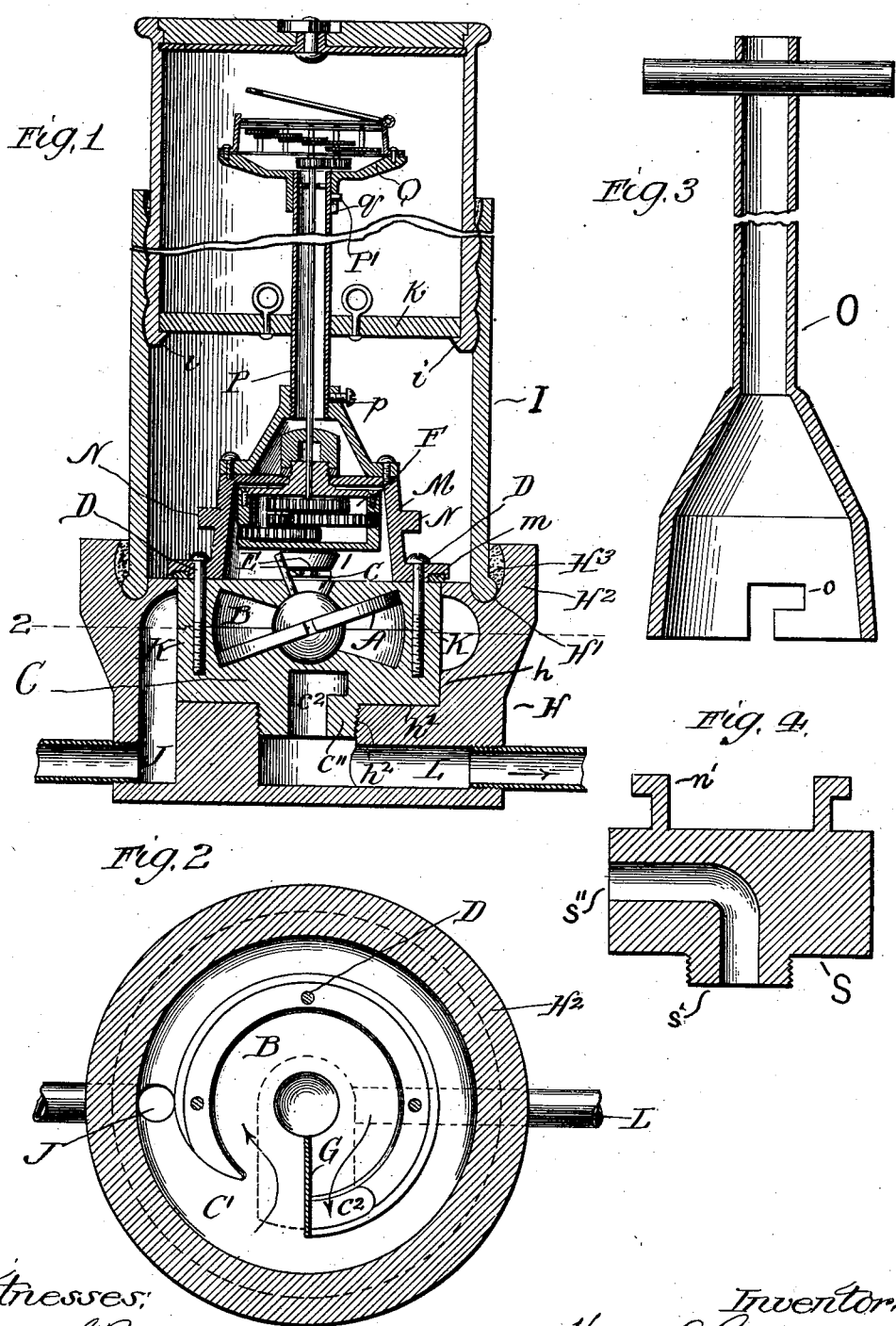

UNITED STATES PATENT OFFICE.

HARRY F. BROWN, OF CHICAGO, ILLINOIS.

WATER-METER.

SPECIFICATION forming part of Letters Patent No. 701,675, dated June 3, 1902.

Application filed August 5, 1901. Serial No. 70,889. (No model.)

*To all whom it may concern:*

Be it known that I, HARRY F. BROWN, a citizen of the United States, residing at Chicago, in the county of Cook and State of Illinois, have invented certain new and useful Improvements in Water-Meters, of which the following is a specification.

The present invention relates to a meter for measuring water that is adapted and especially designed to be used out of doors and to be sunk in the ground to a level below the frost-line. A water-meter thus located is usually inclosed in a tubular box (known to the trade as a "meter-box") which is sunk in the ground to such depth that at bottom it surrounds the meter, whence it extends upward to the ground-level, being provided at top with a suitable closure. It sometimes becomes necessary to have access to the working parts for inspection or repair; and one object of the present invention is to provide a meter and a meter-box of such construction that the working parts of the meter may be easily and quickly removed through the meter-box without entirely disconnecting the meter-casing from the service-pipe. As at present constructed the meter-casing must be entirely disconnected from the service-pipe and removed as a whole in order to gain access to the working parts; but according to the present invention the meter-casing is made up of separable parts so constructed and arranged with relation to each other and to the meter-box that a portion of the meter-casing carrying the working parts of the meter may be removed through the meter-box, leaving the base of the meter-casing in place in the ground and in undisturbed relation to the meter-box and service-pipe. To this end the meter-casing is made up of separable parts having features that are adapted to be engaged or disengaged by a bodily rotation of said removable portion, all of the working parts of the meter being associated with and carried by said removable portion, so that they are taken away with it.

Another object of the invention is to simplify and cheapen the construction of meters, and especially those having boxes of the class described, and to this end a base common to both the meter-box and the meter-casing is used, said base being provided with a seat for the piston-casing and also a seat for the bottom of the meter-box.

Another object of the invention is to provide a special fitting for completing the waterway of a meter of the construction as herein shown when the working parts of the meter are removed.

Other minor objects of the invention will appear hereinafter.

The invention consists in the features of novelty that are herein described.

In the accompanying drawings, which are made a part of this specification, Figure 1 is a vertical central section of a meter embodying the invention. Fig. 2 is a horizontal section thereof on the line 2 2, Fig. 1, with the piston omitted. Fig. 3 is a sectional elevation of a tool adapted for use in removing or putting in place the removable part of the meter-casing. Fig. 4 is a section of a plug for closing the opening in the base when the removable parts of the meter are taken away.

In the drawings I have shown the invention as being embodied in a meter of the disk type; but I desire to have it understood that the invention in no way relates to or is concerned with this feature of the device. On the contrary, the invention is applicable to meters generally, regardless of the type of the piston or the construction and arrangement of the intermediate gearing or the construction and arrangement of the registering mechanism.

In all meters there is a part corresponding in function with the piston-disk A, (shown in the drawings,) and this part occupies a chamber in a part herein called the "piston-casing." In the drawings this chamber is shown at B and the piston-casing at C. The piston-casing is here shown as being composed of two parts that are secured together by bolts D, the upper one of these two parts being provided with an opening $c$, through which passes the stem $a$, which transmits the motion of the piston to the first element E of the intermediate gearing F. The piston-casing C is provided upon one side of a radial diaphragm G with an opening or port $c'$ for the admission of water and upon the opposite side of said diaphragm with an opening or port $c^2$ for the escape of water, the terminus of this latter port being formed in a threaded boss c'', which projects centrally from the bottom of the piston-casing.

H is a part which at one and the same time forms the base of the meter-casing and the base of the meter-box, the sides of which consist of a tube I. The base H is provided at one side with an inlet-port J, terminating in an annular space or channel K, which surrounds the piston-casing at the height of the port c', so that the latter will always be in communication with the former. The base is provided also with an outlet-port L, which communicates with the outlet-port $c^2$. The base is provided with a socket or cavity having a wall h, which forms a seat for the side surface of the piston-casing, a shoulder h', which forms the seat for the bottom of said piston-casing, and a threaded socket $h^2$, into which the boss c'' screws, so that when tightly screwed down a liquid-tight joint will be formed between the piston-casing and the base H. The diameter of the piston-casing is less than the internal diameter of the box I at its most restricted part, so that the piston-casing may be put in place or removed through the box without disturbing the latter. In the drawings I have shown the piston-casing and the base as being secured together by screw-threads; but I desire to have it understood that in its broadest aspect the invention is not limited thereto, but, on the contrary, includes any means whereby these parts may be united or separated one from the other and the removable part of the casing inserted or removed through the box.

On the top of the piston-casing is superposed a part M, shown as being in the form of a cap which contains the intermediate gearing F of the moving system. It is secured to the piston-casing by the aforesaid bolts D and has a flange which projects over the joint between the piston-casing and base and contacts with the latter through the medium of a packing-ring m, so as to form a liquid-tight joint. This superposed part M and the base H, taken together, form a casing which completely incloses the piston-casing.

From the foregoing it is manifest that if the cap M, which is non-rotatively secured to the piston-casing, be turned in one direction or the other said piston-casing will in like manner be turned and may thus be connected to or disconnected from the base. For the purpose of accomplishing this I prefer to provide cap M with studs or gudgeons N, adapted to be engaged by the tool O, (shown in Fig. 3,) said tool being provided with an L-shaped slot o, adapted to receive the studs N after the manner of a bayonet-joint. I desire to have it understood, however, that the invention is not limited to the means for manipulating the part C, and, if desired, the extension-tube P, which carries at its upper end the dial-box Q, may be used for this purpose. In this event the tube P is non-rotatively secured to the cap M by a set-screw p or any other suitable means and may be provided near its upper end with a stud p' for engaging a suitable device for turning it. As shown in the drawings, this stud p' occupies an L-shaped slot q in a tubular extension of the dial-box, so as to form a bayonet-joint therewith. With this arrangement the dial-box itself may be used for turning the tube P, or the dial-box may be removed and a key having an L-shaped slot, such as the slot q, may be applied in place of it.

For the purpose of uniting the base H and the tubular part I of the meter-box the base is provided with a channel H', in which the lower end of the tubular part I seats, and around this channel it is provided with a flange $H^2$ of sufficient diameter to leave between it and the lower part of the tube an annular space for the reception of lead $H^3$, by which a tight joint is formed.

In the drawings I have shown the tubular part of the meter-box as being formed in two sections united by threads, so that the box is adjustable in length; but this forms no part of the present invention.

The tubular part of the meter-box is provided on its interior with a shoulder i, upon which rests a disk k, preferably of felt or some other poor conductor of heat, which divides the interior of the box horizontally and serves to prevent low temperatures in the bottom part of the box.

For the purpose of establishing a waterway through the base when the removable parts of the meter are taken away I may use a plug S, such as shown in Fig. 4. This plug is adapted to fill the socket in the base in which the piston-casing normally fits and is provided on its under side with the externally-threaded boss s', adapted to be screwed into the threaded socket $h^2$ of the base, its top side being provided with studs or gudgeons n' for engaging the tool. The plug is provided with a single port s'', one end of which is adapted to communicate with the annular space K of the base and the other end of which passes through the boss s' and communicates with the outlet-port L of the base.

What I claim as new, and desire to secure by Letters Patent, is—

1. In a meter the combination of a base provided with inlet and outlet ports, a piston-casing removably seated upon the base and having ports communicating with the ports thereof, and a superposed part meeting the base and forming a joint therewith, the piston-casing being connected with said superposed part, so as to be carried thereby when removed, substantially as described.

2. In a meter the combination of a base, provided with inlet and outlet ports, a piston-casing having ports communicating with the ports of the base, the base being provided with a socket in which the piston-casing fits, and a superposed part meeting the base and forming therewith a casing which incloses the piston-casing, the piston-casing being connected with said superposed part, so as to be carried thereby when removed, substantially as described.

3. In a meter the combination of a piston-casing provided with inlet and outlet ports and a meter-casing inclosing the piston-casing and having a base provided with a socket in which the piston-casing fits snugly, said base being provided also with inlet and outlet ports communicating directly with the ports of the piston-casing, substantially as described.

4. In a meter the combination of a piston-casing provided with inlet and outlet ports, a base provided with a socket in which the piston-casing fits, and with ports communicating with the ports of the piston-casing, one of said ports of the base terminating in an annular channel which surrounds the piston-casing, and means for detachably connecting the piston-casing and base, substantially as described.

5. In a meter the combination of a piston-casing provided with inlet and outlet ports, a base provided with a socket in which the piston-casing fits and with ports communicating with the ports of the piston-casing, a superposed part covering the joint between the piston-casing and base, and means for connecting the piston-casing and superposed part, substantially as described.

6. In a meter the combination of a base permanently connected in the waterway provided with inlet and outlet ports, a superposed part contacting with the base and forming therewith the meter-casing, means whereby said superposed part and base are detachably connected, and a moving system carried by said superposed part, substantially as described.

7. In a meter, the combination of a piston, a casing having a chamber occupied by the piston and having inlet and outlet ports, and a meter-casing inclosing the piston-casing and having a base permanently connected in the waterway, said base being provided with a socket in which the piston-casing fits snugly and being provided also with inlet and outlet ports communicating directly with the ports of the piston-casing, substantially as described.

8. In a meter the combination of a base provided with inlet and outlet ports, a superposed part contacting with the base and forming therewith a casing, a piston-casing having ports registering with the ports of the base, means connecting the superposed part and piston-casing, means detachably connecting the piston-casing and base, and a moving system carried by the superposed part, substantially as described.

9. In a meter the combination of a base permanently connected in the waterway and provided with inlet and outlet ports, a piston-casing removably seated upon the base and having ports communicating with the ports thereof, a superposed part meeting the base and forming a joint therewith, said superposed part and piston-casing being connected, a tube, and means reaching down into the said tube and engaging said superposed part for handling it, substantially as described.

10. In a meter the combination of a base permanently connected in the waterway and provided with inlet and outlet ports, a piston-casing having ports communicating with the ports of the base, the base being provided with a socket in which the piston-casing fits, a superposed part meeting the base and forming therewith a casing which incloses the piston-casing, the piston-casing being connected with said superposed part so as to be carried thereby when removed, a tube through which said piston-casing and superposed part may be removed or put in place, and means reaching down into the said tube and engaging said superposed part for handling it, substantially as described.

11. In a meter the combination of a base permanently connected in the waterway and provided with inlet and outlet ports, a superposed part contacting with the base and forming therewith the meter-casing, means whereby said superposed part and base are detachably connected, a piston-casing inclosed by the meter-casing, a moving system carried by said superposed part, a tube through which said superposed part and its accessories may be removed or put in place, and means reaching down in the said tube and engaging said superposed part for handling it, substantially as described.

12. In a meter the combination of a base permanently connected in the waterway and provided with inlet and outlet ports, a superposed part contacting with the base and forming therewith the meter-casing, means whereby said superposed part may be connected with or disconnected from the base by a bodily rotation of said part, a piston-casing inclosed by the meter-casing, a moving system carried by said superposed part, a tube through which said superposed part may be removed or put in place, and means reaching down into the said tube and engaging said superposed part for handling it, substantially as described.

13. In a meter the combination of a base permanently connected in the waterway and having inlet and outlet ports, a superposed part contacting with the base and forming therewith a casing, a piston-casing having ports communicating with the ports of the base, means connecting the superposed part and piston-casing whereby the one carries the other, means detachably connecting the piston-casing and base, a moving system carried by the superposed part, a tube through which said superposed part and piston-casing may be put in place or removed, and means reaching down into the said tube and engaging said superposed part for handling it, substantially as described.

14. In a meter the combination of a meter-casing including a base permanently connected in the waterway and provided with inlet and outlet ports, a piston-casing inclosed by the meter-casing and removably seated directly upon the base and having ports communicating with the ports thereof, a tube also seated upon the said base and forming therewith the meter-box, and means reaching down into the said tube and engaging said piston-casing for handling it, substantially as described.

15. In a meter the combination of a meter-casing including a base permanently connected in the waterway and provided with inlet and outlet ports, a piston-casing inclosed by the meter-casing and removably seated directly upon the base and having ports communicating with the ports thereof, means whereby said piston-casing and base may be connected or disconnected by a bodily rotation of the piston-casing, and a tube also seated upon said base, substantially as described.

16. In a meter the combination of a meter-casing including a base permanently connected in the waterway and provided with inlet and outlet ports, a piston-casing inclosed by the meter-casing and removably seated directly upon the base and having ports communicating with the ports thereof, said piston-casing and base having threaded engagement with each other, a tube also seated upon said base and forming therewith the meter-box, and means reaching down into the said tube and engaging the piston-casing for handling it, substantially as described.

17. In a meter the combination of a base permanently connected in the waterway and provided with inlet and outlet ports, a piston-casing removably seated upon the base and having ports communicating with the ports thereof, a superposed part meeting the base and forming therewith a casing inclosing the piston-casing, means connecting said superposed part and piston-casing, and a tube also seated upon said base and forming therewith the meter-box, substantially as described.

18. In a meter the combination of a base permanently connected in the waterway and provided with inlet and outlet ports, a piston-casing having ports communicating with the ports of the base, the base being provided with a socket in which the piston-casing fits, a superposed part meeting the base and forming therewith a casing, which incloses the piston-casing, the piston-casing being connected with said superposed part so as to be carried thereby when removed, and a tube also seated upon said base, substantially as described.

19. A base for a meter permanently connected in the waterway and provided with a socket adapted to receive the piston-casing and with inlet and outlet ports, one of which terminates in an annular channel surrounding said socket, a plug adapted to fit in said socket and having ports communicating with the ports of the base, and means for detachably connecting the plug and base, substantially as described.

20. In a meter, the combination of a meter-casing comprising a base permanently connected in the waterway and having inlet and outlet ports and a removable superposed part, and a piston-casing inclosed by the meter-casing and having ports communicating directly with the ports of the base, said piston-casing being removably supported by the base whereby it may be removed from above, leaving the base in undisturbed relation to the waterway, substantially as described.

HARRY F. BROWN.

Witnesses:
MARIE NICHOLLS,
L. M. HOPKINS.